(12) United States Patent
Nam et al.

(10) Patent No.: US 11,509,204 B2
(45) Date of Patent: Nov. 22, 2022

(54) AXIAL AIR GAP MOTOR AND CLOTHING PROCESSING APPARATUS HAVING SAME

(71) Applicant: LG ELECTRONICS INC., Seoul (KR)

(72) Inventors: Hyounguk Nam, Seoul (KR); Seungsuk Oh, Seoul (KR); Dosun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 622 days.

(21) Appl. No.: 16/488,099

(22) PCT Filed: Feb. 6, 2018

(86) PCT No.: PCT/KR2018/001561
§ 371 (c)(1),
(2) Date: Aug. 22, 2019

(87) PCT Pub. No.: WO2018/155843
PCT Pub. Date: Aug. 30, 2018

(65) Prior Publication Data
US 2020/0067392 A1    Feb. 27, 2020

(30) Foreign Application Priority Data
Feb. 24, 2017 (KR) .................. 10-2017-0024941

(51) Int. Cl.
*H02K 1/18* (2006.01)
*H02K 7/08* (2006.01)
(Continued)

(52) U.S. Cl.
CPC ........... *H02K 21/24* (2013.01); *D06F 37/304* (2013.01); *H02K 1/182* (2013.01); *H02K 7/088* (2013.01); *H02K 16/02* (2013.01)

(58) Field of Classification Search
CPC .... H02K 1/182; H02K 1/2793; H02K 1/2795; H02K 1/2798; H02K 7/086; H02K 7/088;
(Continued)

(56) References Cited

U.S. PATENT DOCUMENTS

2004/0245879 A1    12/2004  Hirzel et al.
2005/0035676 A1 *   2/2005  Rahman .................. B60L 7/14
                                                     180/65.6
(Continued)

FOREIGN PATENT DOCUMENTS

JP      2002531040 A  *  9/2002
KR    10-2001-0094208      10/2001
(Continued)

OTHER PUBLICATIONS

Korean Patent Application No. 10-2017-0024941 dated Feb. 24, 2017.
(Continued)

*Primary Examiner* — Eric Johnson
(74) *Attorney, Agent, or Firm* — KED & Associates LLP

(57) ABSTRACT

An axial air gap motor comprises: a frame; a stator that is arranged in an outer side of the frame in a radial direction; a first rotor that is spaced from one side of the stator in an axial direction, that has an air gap therebetween, and that is rotatably arranged in one side of the frame; and a second rotor that is spaced from the other side of the stator in the axial direction, that has an air gap therebetween, that is rotatably arranged in the other side of the frame, and that is connected with the first rotor in the axial direction.

19 Claims, 16 Drawing Sheets

(51) Int. Cl.
  *H02K 16/02* (2006.01)
  *H02K 21/24* (2006.01)
  *D06F 37/30* (2020.01)

(58) Field of Classification Search
  CPC ...... H02K 16/02; H02K 21/24; H02K 5/1737;
  D06F 37/304
  See application file for complete search history.

(56) References Cited

U.S. PATENT DOCUMENTS

| | | | |
|---|---|---|---|
| 2010/0156216 A1 | 6/2010 | Lee et al. | |
| 2010/0275660 A1* | 11/2010 | Yoon | H02K 21/24 310/215 |
| 2012/0024610 A1* | 2/2012 | Woolmer | H02K 21/24 310/75 R |
| 2014/0009022 A1* | 1/2014 | Kim | H02K 21/24 310/114 |

FOREIGN PATENT DOCUMENTS

| | | | | |
|---|---|---|---|---|
| KR | 10-2005-0000245 | 1/2005 | | |
| KR | 10-0468983 | 1/2005 | | |
| KR | 10-0799364 | 1/2008 | | |
| KR | 10-0803570 | 2/2008 | | |
| KR | 10-2008-0094274 | 10/2008 | | |
| KR | 10-2010-0073450 | 7/2010 | | |
| KR | 10-2010-0089162 | 8/2010 | | |
| KR | 10-0976884 | 8/2010 | | |
| KR | 10-2011-0139434 | 12/2011 | | |
| KR | 10-2012-0108687 | 10/2012 | | |
| KR | 10-1486344 | 1/2015 | | |
| KR | 10-2016-0123428 | 10/2016 | | |
| WO | WO-0147089 A2 * | 6/2001 | ............... | B60K 6/26 |
| WO | WO-2016113567 A1 * | 7/2016 | ............. | H02K 1/182 |

OTHER PUBLICATIONS

Korean Office Action dated Apr. 20, 2018 issued in Application No. 10-2017-0024941.
International Search Report (with English Translation) and Written Opinion dated May 17, 2018 issued in Application No. PCT/KR2018/001561.
Korean Office Action dated Oct. 29, 2018 issued in Application No. 10-2017-0024941.
Korean Notice of Allowance dated Jan. 18, 2019 issued in Application No. 10-2017-0024941.

* cited by examiner

AXIAL AIR GAP MOTOR AND CLOTHING PROCESSING APPARATUS HAVING SAME

CROSS-REFERENCE TO RELATED PATENT APPLICATIONS

This application is a U.S. National Stage Application under 35 U.S.C. § 371 of PCT Application No. PCT/KR2018/001561, filed Feb. 6, 2018, which claims priority to Korean Patent Application No. 10-2017-0024941, filed Feb. 24, 2017, whose entire disclosures are hereby incorporated by reference.

TECHNICAL FIELD

The present disclosure relates to an axial air gap motor, and a clothing processing apparatus having the same.

BACKGROUND ART

As is well known, a clothing processing apparatus is a kind of apparatus for treating (washing) clothes or laundry through a washing process and a rinsing process.

The laundry includes not only clothes but also washable items such as bedclothes such as blankets, curtains, stuffed toys and the like.

The clothing processing apparatus, typically, includes a cabinet, a tub provided in the cabinet, a drum rotatably disposed in the tub, and a driving motor configured to rotate the drum.

However, in the related art clothing processing apparatus, the tub is spaced apart from an inner surface of the cabinet with a predetermined interval so as to suppress collision between components, which is generated by vibration during an operation. Accordingly, this makes it difficult to increase a washing capacity (tub and drum) without increasing a size of the cabinet.

Meanwhile, a motor, as is well known, is a device that converts an electrical energy to a mechanical energy.

Such a motor includes a stator and a rotor rotatably disposed with respect to the stator.

The motor is classified into an "inner rotor" type in which the rotor is provided inside the stator and an "outer rotor" type in which the rotor is provided outside the stator.

When the inner rotor type motor is used in the clothing processing apparatus, an axial length thereof should be increased so that an axial length of the tub and the drum are decreased accordingly, thereby reducing the washing capacity.

In view of this problem, the outer rotor type is mainly used for a driving motor of the clothing processing apparatus.

However, in the related art driving motor of the clothing processing apparatus, the stator and the rotor should have a specific axial length in order to output an amount of torque required in a clothing processing process. Thus, there is a limitation in reducing the axial length of the driving motor.

Accordingly, it is difficult to increase the tub (drum) capacity without increasing a size of the cabinet.

Meanwhile, in some of the motors, there is an axial air gap type motor in which a stator and a rotor are disposed to be apart from each other with an axial gap along an axial direction.

However, in this related art axial air gap motor, a rotor is disposed in a radial direction with respect to a shaft, and an inner end thereof is coupled to the shaft but an outer end thereof is not properly supported. Accordingly, it is difficult to constantly (or uniformly) maintain an axial gap due to an attraction or repulsion force between the stator and the rotor.

In addition, as the outer end of the rotor is not sufficiently supported, the rotor can be easily deformed, and vibration and noise generation during an operation are increased.

Further, a motor case (enclosure) for mounting the stator on an object needs to be provided, thereby increasing weight and an external size.

In addition, when the motor case (enclosure) is added, an axial length thereof is increased accordingly.

Further, the stator and the rotor are configured to be supported by the shaft having a relatively longer axial length, which is not only increasing weight of the motor but also making it difficult to reduce the axial length of the motor.

DISCLOSURE

Technical Problem

Therefore, one aspect of the present disclosure is to provide a structure of an axial air gap motor capable of suppressing vibration and noise during an operation.

Another aspect of the present disclosure is to provide a structure of an axial air gap motor capable of reducing an axial size and a radial size of the motor.

Still another aspect of the present disclosure is to provide a structure of an axial air gap motor capable of suppressing vibration and noise during an operation even when a radial size of the motor is increased.

Still another aspect of the present disclosure is to provide a structure of an axial air gap motor capable of reducing weight and an axial length of the motor by eliminating a shaft for supporting a stator and a rotor.

Still another aspect of the present disclosure is to provide a clothing processing apparatus employing the axial air gap motor with the structure that can reduce an installation space and increase a clothing processing capacity without increasing a size of a cabinet.

Technical Solution

In order to achieve the aspects and other advantages, there is provided an axial air gap motor including a frame coupled to an object, a stator disposed on an outer side of the frame along a radial direction, a first rotor spaced apart from one side of the stator with an air gap along an axial direction and rotatably disposed on one side of the frame, a second rotor spaced apart from another side of the stator with an air gap along the axial direction and rotatably disposed on another side of the frame, and a rotor end supporting portion provided on an outer side of the stator along the radial direction so as to axially support the first rotor and the second rotor.

In one example of the present disclosure, the first rotor and the second rotor are formed to such that areas corresponding to an outer side of the stator along a radial direction are integrally connected to each other.

Accordingly, axial displacement and deformation of the first rotor and the second rotor are suppressed, thereby suppressing vibration and noise generated during an operation.

In one example of the present disclosure, a rotor end supporting portion may be provided on an outer side of the stator along the radial direction so as to axially support the first rotor and the second rotor.

In one example of the present disclosure, the frame may include a frame body with a cylindrical shape, a first rotor supporting portion formed on one side of an outer surface of the frame body, a second rotor supporting portion formed in an inner surface of the frame body, and a stator supporting portion formed on another side of the outer surface of the frame body.

In one example of the present disclosure, the frame may be provided with a mounting surface axially protruding with respect to the first rotor so as to be in contact with the object.

In one example of the present disclosure, the rotor end supporting portion may include a connecting member connecting the first rotor and the second rotor by being disposed therebetween.

In one example of the present disclosure, a connecting portion may be provided on the first rotor or the second rotor.

The connecting member and the connecting portion may be formed in a cylindrical shape, respectively.

The connecting member and the connecting portion may have a rod-like shape, respectively, and be formed in plurality so as to be spaced apart from each other along a circumferential direction of the first rotor and the second rotor.

In one example of the present disclosure, the first rotor and the second rotor may each include a rotor frame with a disk shape and a permanent magnet provided on the rotor frame so as to magnetically interact with the stator.

In one example of the present disclosure, the rotor frame may be formed of a magnetic material.

In one example of the present disclosure, the permanent magnet may be provided with a plurality of magnetic pole portions spaced apart from each other along a circumferential direction.

In one example of the present disclosure, the rotor frame may be provided with a plurality of salient pole portions each protruding toward the stator between the plurality of magnetic pole portions.

In one example of the present disclosure, a first bearing may be further provided between the first rotor and the frame so as to rotatably support the first rotor.

The first rotor may be provided with a first bearing coupling portion so that the first bearing is coupled thereto.

In one example of the present disclosure, a second bearing may be provided between the second rotor and the frame so as to rotatably support the second rotor.

The second rotor may be provided with a second bearing coupling portion so that the second bearing is coupled thereto.

In one example of the present disclosure, the second bearing coupling portion may be inserted into an inner side of the second bearing.

The second bearing coupling portion may be provided with a rotation shaft connecting member to which the rotation shaft provided on the object is connected.

In one example of the present disclosure, the frame may be provided with a fixing member insertion hole in which a fixing member is inserted, the fixing member is coupled to the object through the frame along the axial direction.

The second rotor may be provided with a communicating hole communicating with the fixing member insertion hole so that the fixing member is inserted therein.

In one example of the present disclosure, the stator may include a stator core disposed on an outer side of the frame along the circumferential direction, and a stator coil wound around the stator core.

In one example of the present disclosure, the stator core may be provided with a plurality of teeth disposed to be apart from each other along the circumferential direction.

The stator may be provided with an insulation portion formed by molding around the plurality of teeth.

In one example of the present disclosure, each of the plurality of teeth may include a horizontal section disposed in the axial direction, and a vertical section radially extended from both ends of the horizontal section and spaced apart from the first rotor and the second rotor, respectively.

The stator coil may be wound around the horizontal section.

In one example of the present disclosure, the permanent magnet of the first rotor has a same magnetic pole as the permanent magnet of the second rotor along the axial direction.

In one example of the present disclosure, the stator core may include a yoke portion with a circular shape.

The stator core may include a plurality of teeth protruding from the yoke toward the first rotor and the second rotor, respectively.

In one example of the present disclosure, the stator coil may be wound around the yoke portion.

In one example of the present disclosure the permanent magnet of the first rotor may have an opposite magnetic pole to the permanent magnet of the second rotor along the axial direction.

In order to achieve the aspects and other advantages, there is also provided a clothing processing apparatus including a cabinet, a tub disposed in the cabinet, a drum rotatably disposed in the tub, and provided with a rotation shaft protruding outward of the tub, and the axial air gap motor mounted on an outer surface of the tub and connected to the rotation shaft so as to rotate the drum.

In one example of the present disclosure, the tub may be provided with a housing rotatably supporting the rotation shaft of the drum.

The frame of the axial air gap motor may be coupled to the housing along an axial direction.

Advantageous Effects

As described above, in an axial air gap motor according to one embodiment of the present disclosure, a first rotor and a second rotor are provided on opposite sides of a stator along an axial direction, thereby increasing an output of the motor and reducing an axial length of the motor.

In addition, a rotor end supporting portion is provided to axially support the first rotor and the second rotor, respectively, by axially connecting outer ends of the first rotor and the second rotor, thereby offsetting a magnetic force between the stator and the first rotor, and a magnetic force between the stator and the second rotor. Thus, vibration can be suppressed and noise generated by the vibration can be suppressed accordingly.

Further, a hollow frame is provided at a central part, the first rotor is rotatably coupled to an outer side of the frame and the second rotor is rotatably coupled to an inner side of the frame, and at the same time the first rotor and the second rotor are integrally connected to each other by the rotor end supporting portion. Thus, a shaft for supporting the first rotor and the second rotor is not needed.

Accordingly, a total weight and an axial length of the motor can be reduced.

In addition, as the frame is provided at the central part, the first rotor and the second rotor are rotatably coupled to the outer side and the inner side of the frame, respectively, and a mounting surface axially protruding and mounted on an object is provided on the frame, an axial size and a radial size of the motor can be reduced.

As a result, a motor installation space inside a cabinet of a clothing processing apparatus can be reduced, and a capacity of a tub and a drum can be increased accordingly, thereby increasing a clothing processing capacity.

In addition, the first rotor and the second rotor are provided with a rotor frame formed of a magnetic material, respectively, so that a back yoke of a permanent magnet can be reduced, and an axial length (thickness) thereof can be reduced accordingly.

Further, as the stator is provided with a stator core having a plurality of teeth disposed to be apart from each other in a circumferential direction, a stator coil wound around each of the plurality of teeth, and an insulation portion molded to enclose the stator core and the stator coil, an amount of magnetic materials required for generating the stator core can be reduced, and weight of the stator can be reduced accordingly.

MODES FOR CARRYING OUT THE PREFERRED EMBODIMENTS

Hereinafter, embodiments disclosed in this specification will be described in detail with reference to the accompanying drawings. In this specification, the same or equivalent components may be provided with the same or similar reference numbers even in different embodiments, and description thereof will not be repeated. A singular representation may include a plural representation unless it represents a definitely different meaning from the context. In describing the present disclosure, if a detailed explanation for a related known technology or construction is considered to unnecessarily divert the gist of the present disclosure, such explanation has been omitted but would be understood by those skilled in the art. It should be noted that the attached drawings are provided to facilitate understanding of the embodiments disclosed in this specification, and should not be construed as limiting the technical idea disclosed in this specification by the attached drawings.

Figure 1:
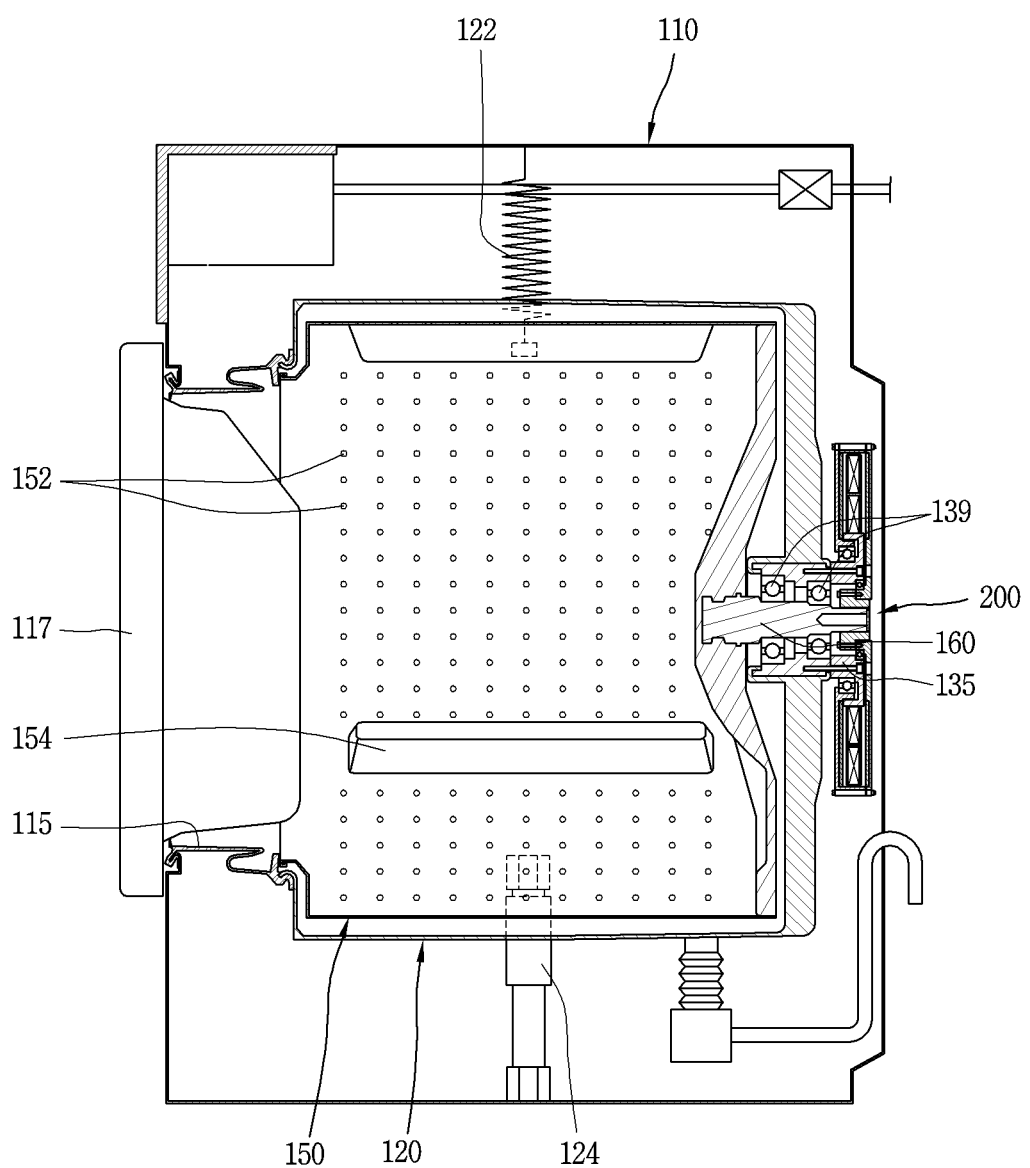
FIG. 1 is a sectional view of a clothing processing apparatus having an axial air gap motor in accordance with one embodiment of the present disclosure.
Figure 2:
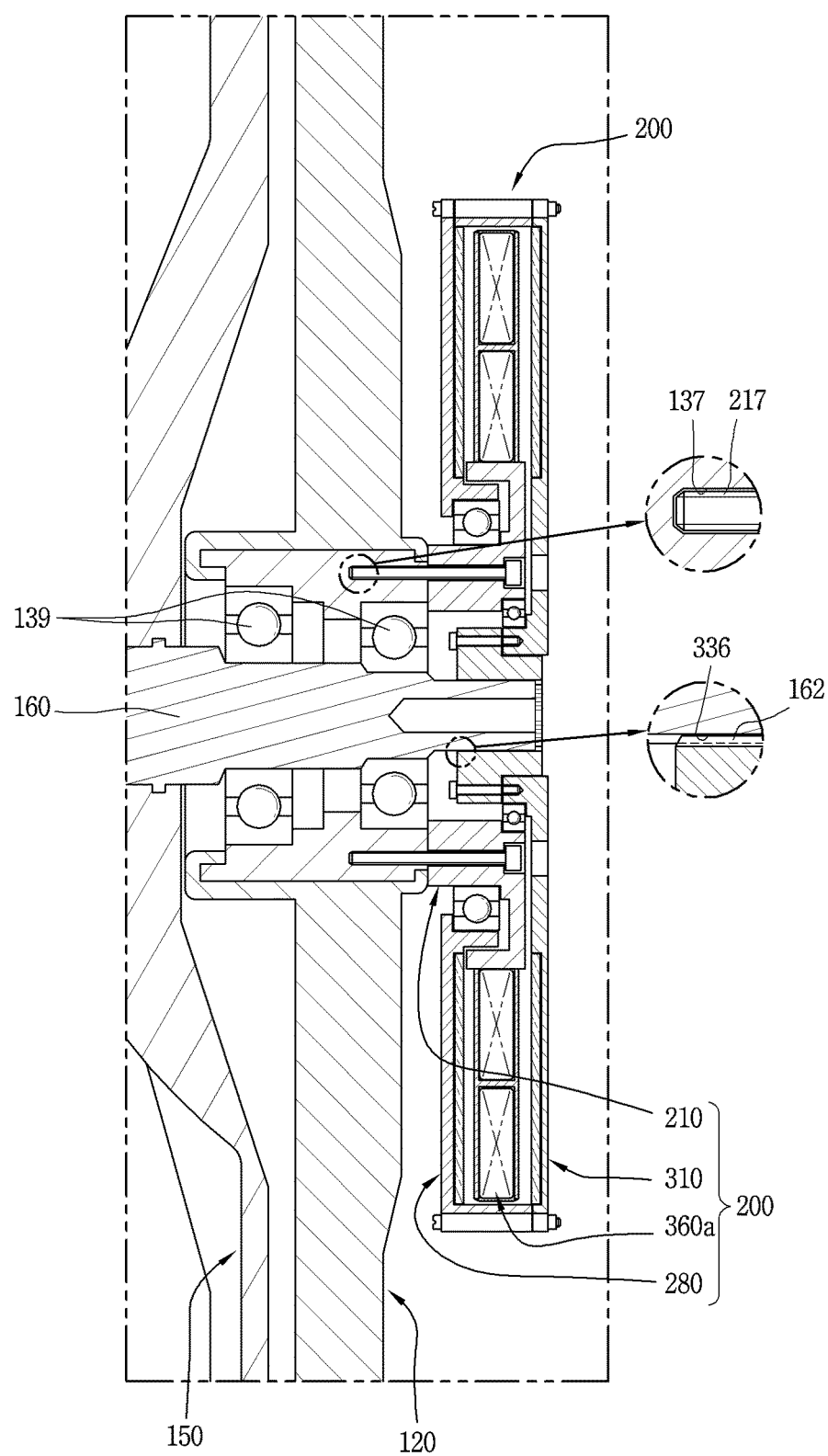
FIG. 2 is an enlarged view of a coupling area of the axial air gap motor of FIG. 1.

FIG. 1 is a sectional view of a clothing processing apparatus having an axial air gap motor in accordance with one embodiment of the present disclosure, and FIG. 2 is an enlarged view of a coupling area of the axial air gap motor of FIG. 1.

However, an axial air gap motor according to the present disclosure can be applied to various apparatuses, and a clothing processing apparatus described herein is only one example of it. The axial air gap motor may also be applicable to a device in which a fan motor is used.

In FIG. 1, a clothing processing apparatus employing an axial air gap motor according to the present disclosure is illustrated as its example.

Referring to FIG. 1, a clothing processing apparatus having an axial air gap motor according to one embodiment of the present disclosure may include a cabinet 110, a tub 120 provided in the cabinet 110, a drum 150 rotatably disposed in the tub 120 and provided with a rotation shaft 160 protruding to an outside of the tub 120, and an axial air gap motor 200 mounted on an outer surface of the tub 120 and connected to the rotation shaft 160 to rotate the drum 150.

The cabinet 110, for example, may have substantially a cuboid shape forming an accommodating space therein.

An opening 115 may be provided on a front surface of the cabinet 110 so as to put laundry in and out of the cabinet 110.

The cabinet 110 may be provided with a door 117 configured to open and close the opening 115.

The tub 120 may be provided in the case 110.

The tub 120, for example, may have a cylindrical shape having an open front surface.

The tub 120, for example, may be buffered and supported by a suspension device having a plurality of springs 122 and/or dampers 124.

The drum 150 may be accommodated in the tub 120 in a rotatable manner.

A plurality of through holes 152 may be formed through the drum 150 so that an inside and an outside of the drum 160 communicate with each other.

A plurality of lifters 154 may be provided in the drum 150 configured to move laundry upward during rotation.

Each of the plurality of lifters 154 may be formed to protrude from an inner diameter surface of the drum 150 along a radial direction and to extend in an axial direction.

The axial air gap motor 200 according to the present disclosure configured to rotatably operate the drum 150, may be provided on a rear surface of the tub 120.

In this embodiment, the axial air gap motor 200 is applied to a "front load" clothing processing apparatus configured to put laundry in and out of a front of the cabinet 110. However, it is just an example, the axial air gap motor 200 can also be applied to a "top load" clothing processing apparatus configured to put laundry in and out of a top end of the cabinet 110.

The rotation shaft 160 protruding backward may be provided at a rear end of the drum 150.

The rotation shaft 160, for example, may be provided with a serration 162 so as to be coupled to the axial air gap motor 200 as illustrated in FIG. 2.

A rotation shaft supporting portion 130 may be formed at a rear end of the tub 120 for supporting the rotation shaft 160 to protrude backward.

The rotation shaft supporting portion 130, for example, may include a housing 135 having a cylindrical shape and a plurality of bearings 139 provided in the housing 135.

The housing 135 may be formed of a metal member.

The plurality of bearings 139 may be disposed to be apart from each other along an axial direction of the rotation shaft 160.

A bearing receiving portion for each of the plurality of bearings 139 may be provided at the housing 135, so as to accommodatingly support each of the plurality of bearings 139.

The housing 135, for example, may be provided with a plurality of female thread portions 137 so that a fixing member 217 to be described later is screwed into the housing 135.

The plurality of female thread portions 137, for example, may be formed to be spaced apart from each other along a circumferential direction of the housing 135.

Hereinafter, a clothing processing apparatus according to one embodiment of the present disclosure will be described in detail with reference to FIGS. 3 to 10.

Figure 3:
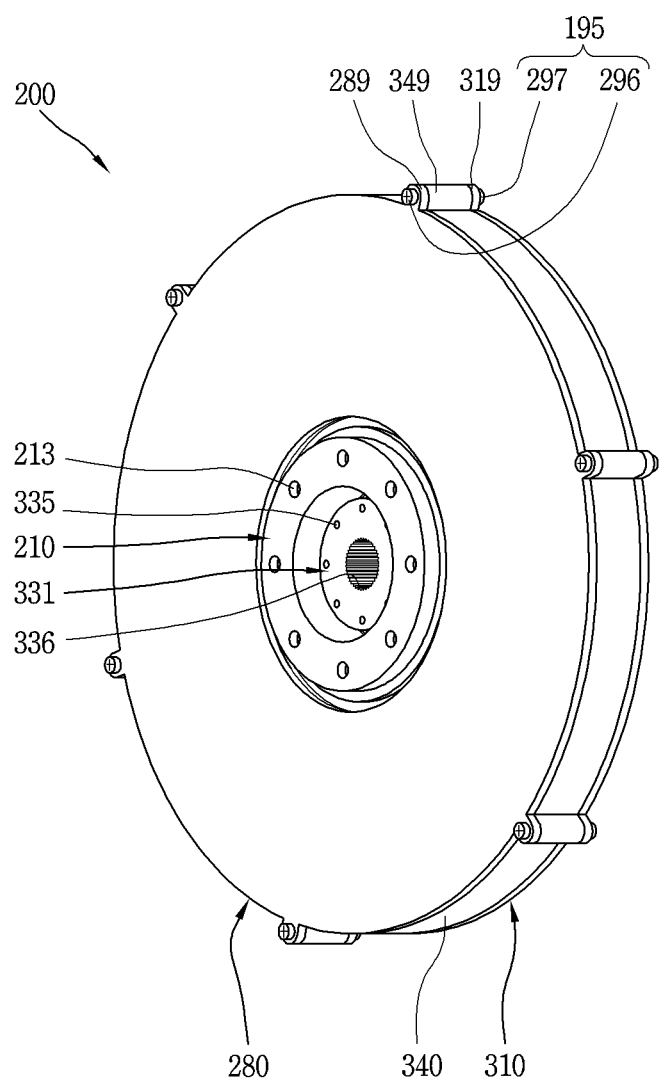
FIG. 3 is a perspective view of the axial air gap motor of FIG. 1.
Figure 4:
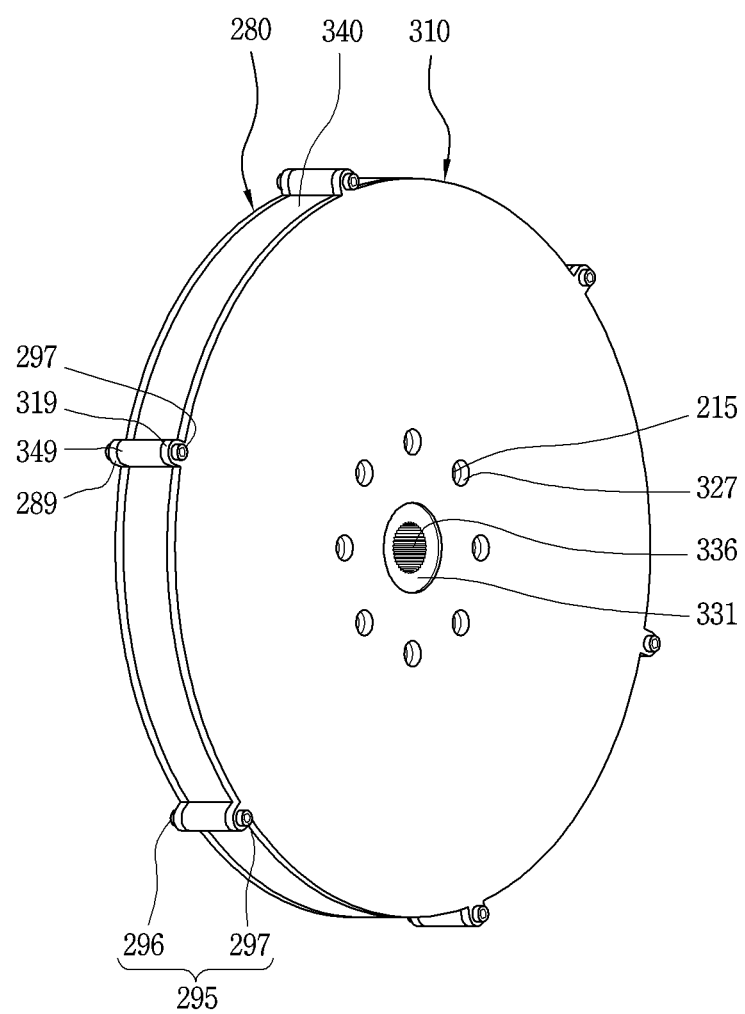
FIG. 4 is a perspective view of a rear surface of the motor of FIG. 3.
Figure 5:
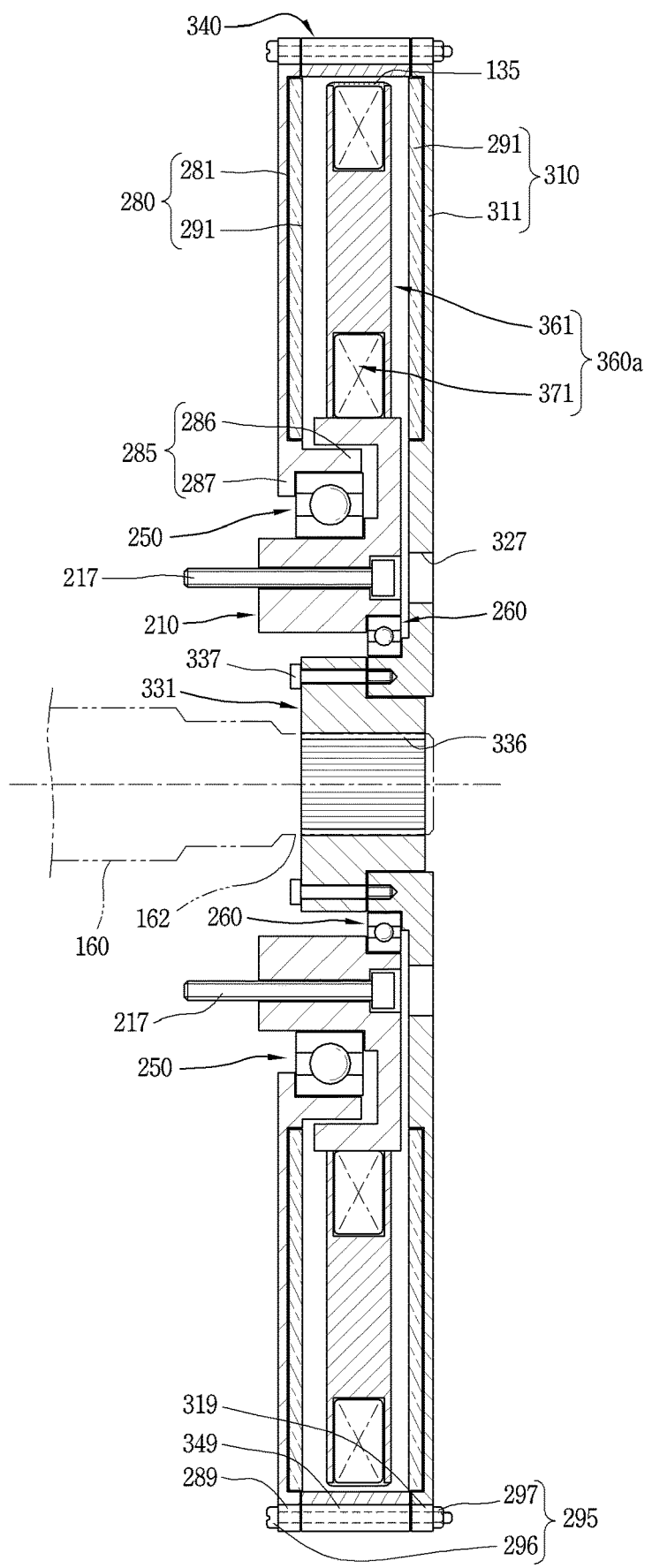
FIG. 5 is a sectional view of the motor of FIG. 3.
Figure 6:
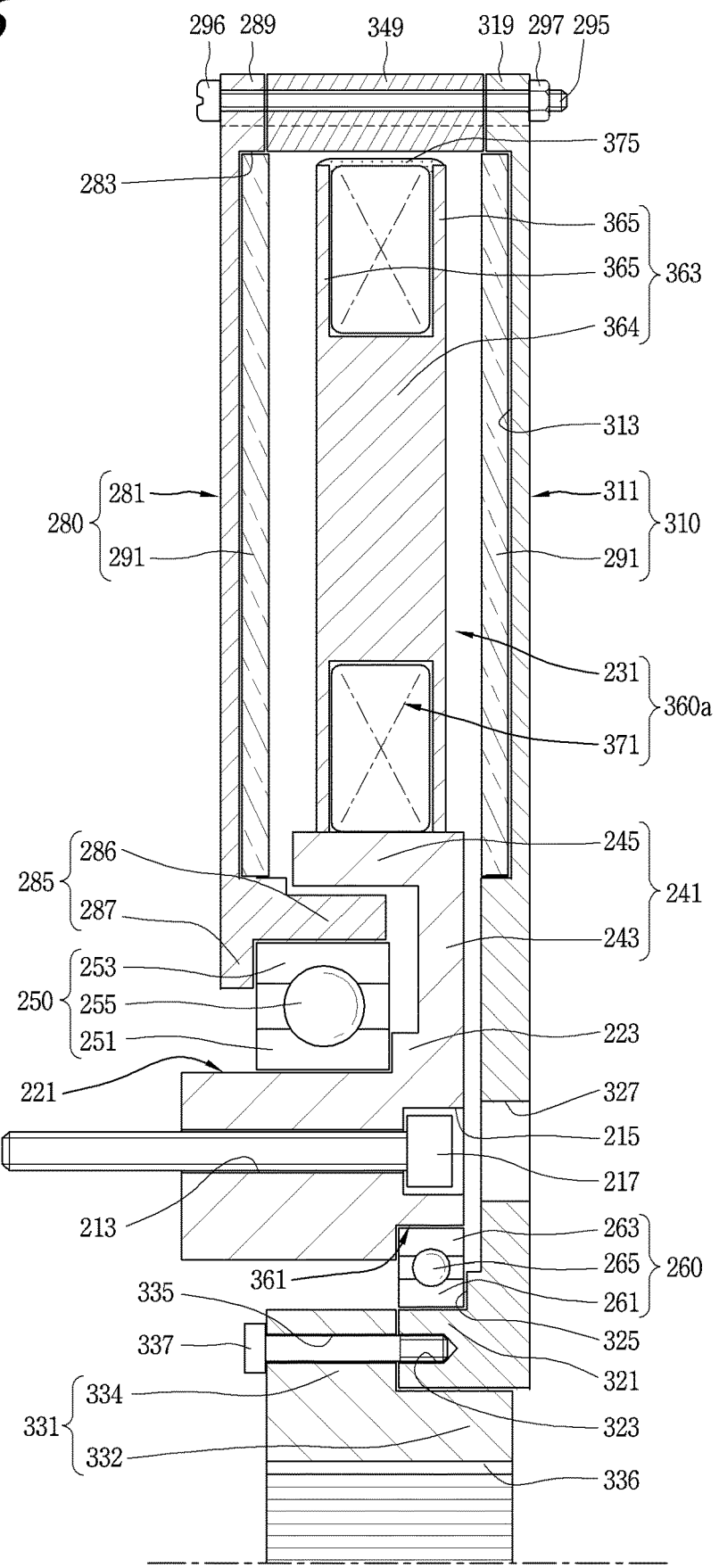
FIG. 6 is an enlarged view of a main portion of the motor of FIG. 5.
Figure 7:
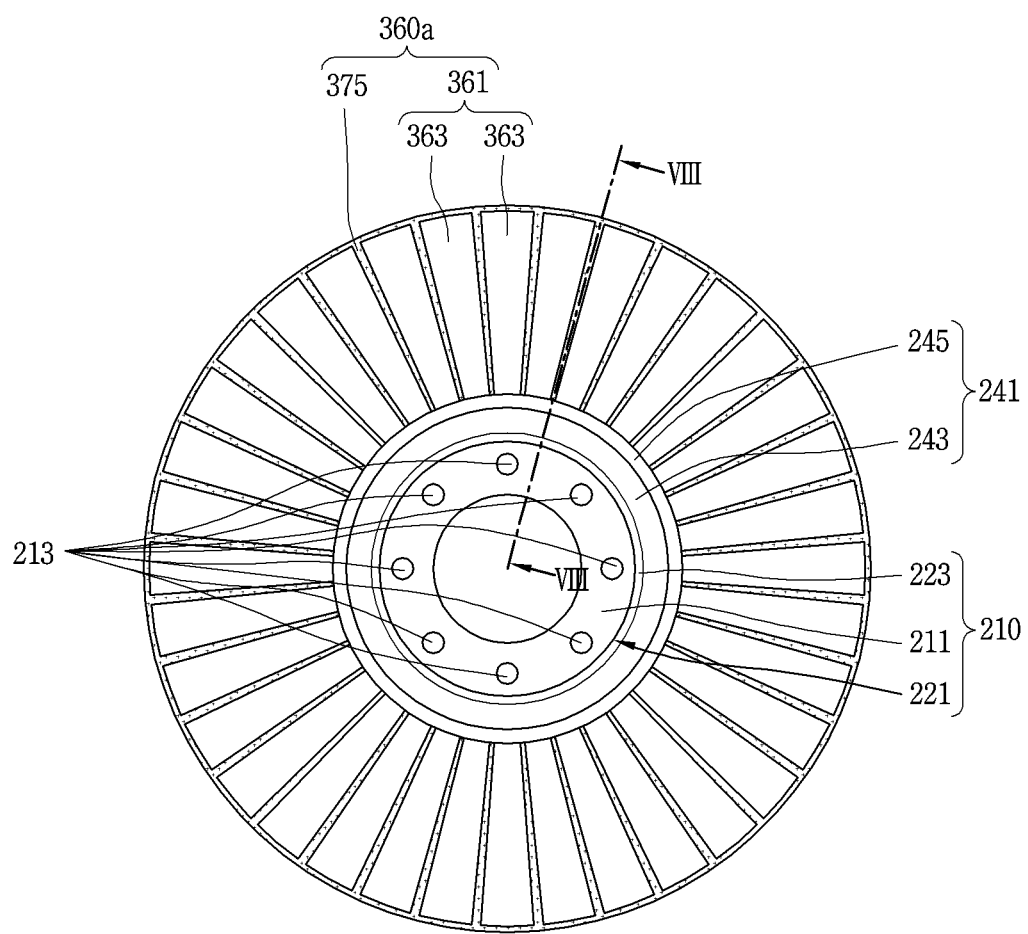
FIG. 7 is a side view of the frame and the stator of FIG. 3.
Figure 8:
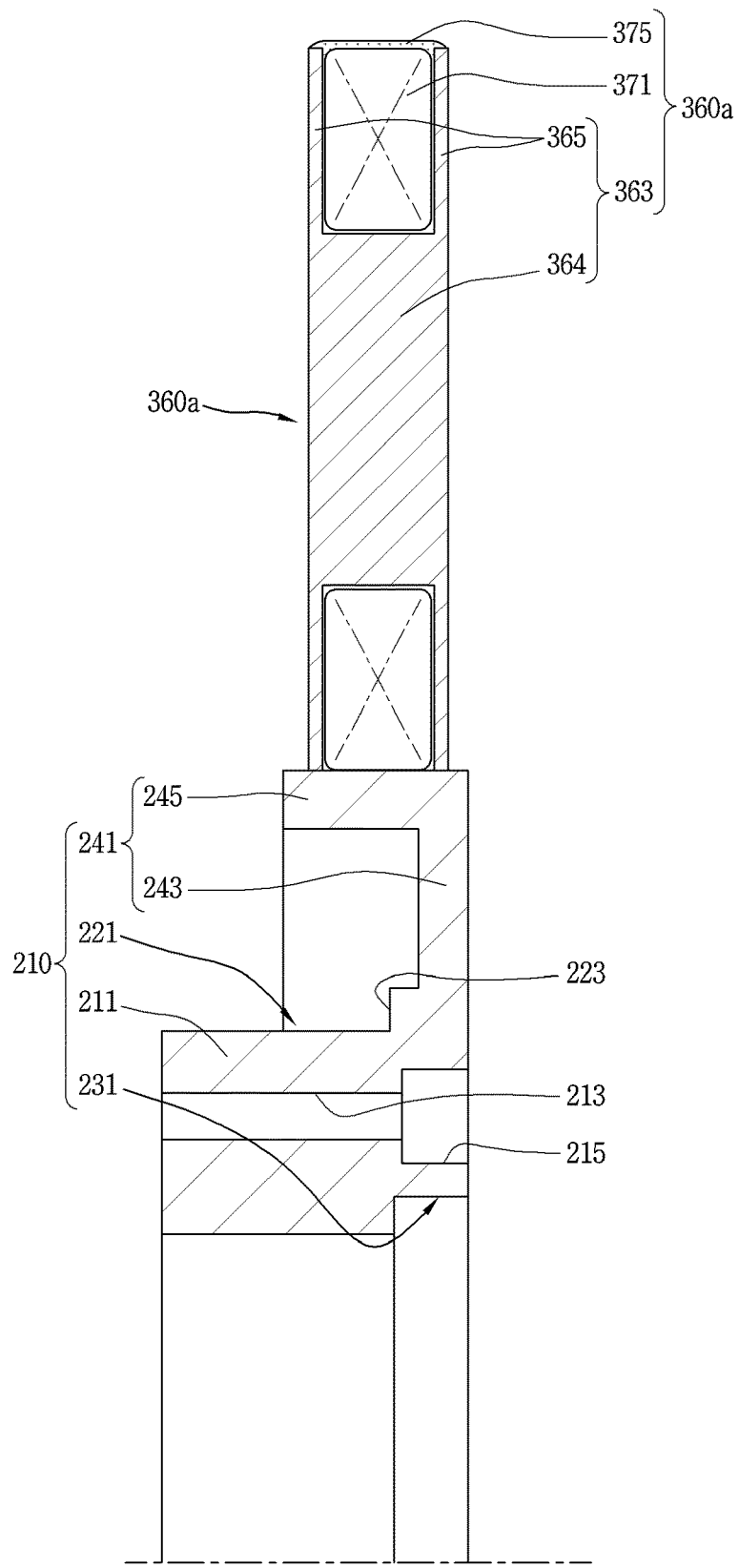
FIG. 8 is a sectional view of the frame and the stator of FIG. 7.
Figure 9:
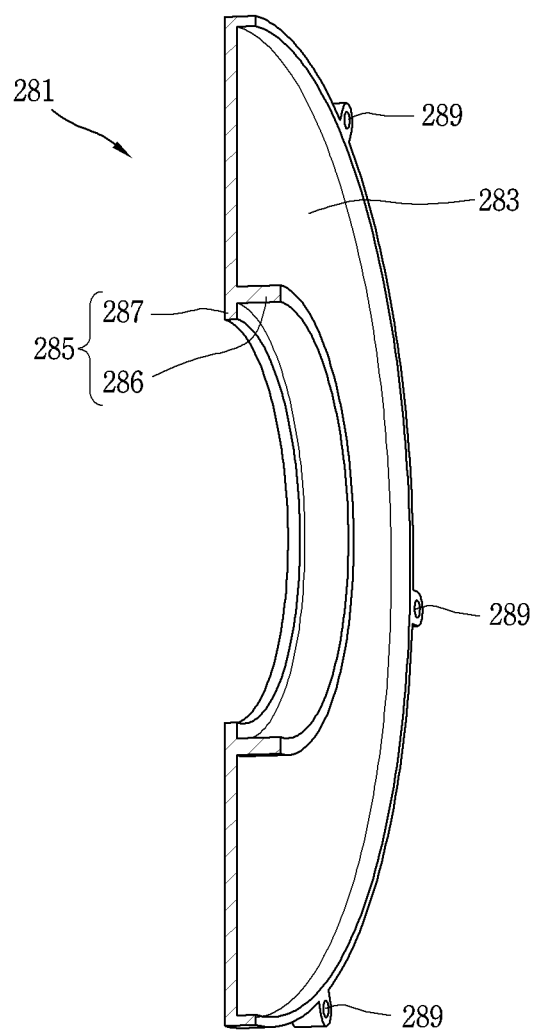
FIG. 9 is an enlarged view of the first rotor frame of FIG. 3.
Figure 10:
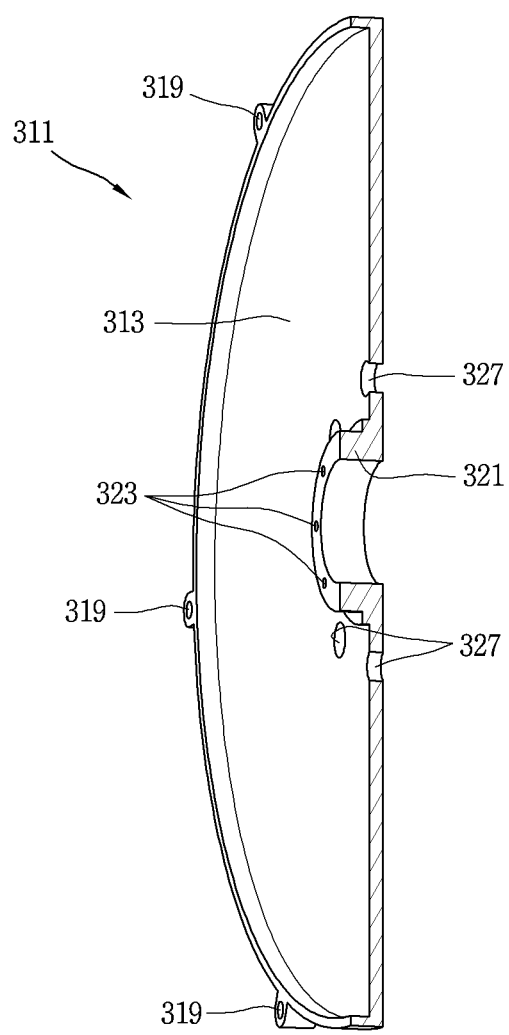
FIG. 10 is an enlarged view of the second rotor frame of FIG. 3.

FIG. 3 is a perspective view of the axial air gap motor of FIG. 1, FIG. 4 is a perspective view of a rear surface of the motor of FIG. 3, FIG. 5 is a sectional view of the motor of FIG. 3, FIG. 6 is an enlarged view of a main portion of the motor of FIG. 5, FIG. 7 is a side view of the frame and stator of FIG. 3, FIG. 8 is a sectional view of the frame and stator of FIG. 7, FIG. 9 is an enlarged view of the first rotor frame of FIG. 3, and FIG. 10 is an enlarged view of the second rotor frame of FIG. 3.

Referring to FIGS. 3 and 4, the axial air gap motor 200 according to one embodiment of the present disclosure is provided with a frame 210 coupled to an object, and a first rotor 280 and a second rotor 310 rotatably coupled with respect to the frame 210, so as to be formed in a thin disc shape.

The frame 210 is provided at a central area of the first rotor 280 to be exposed outside.

The second rotor 310 has a disc shape and is disposed to be apart from the first rotor along the axial direction.

A rotor end supporting portion (or circumferential support band) 340 is provided between the first rotor 280 and the second rotor 310.

More specifically, referring to FIGS. 5 and 6, the axial air gap motor 200 according to this embodiment may include a stator 360a provided on an outer side of the frame 210 along the radial direction.

The frame 210, for example, may have a cylindrical shape.

The frame 210 may be coupled to a rear end portion of the tub 120 along the axial direction.

As aforementioned, the frame 210 may be fixedly coupled to the housing 135 of the tub 120.

The stator 360a may be provided on the outer side of the frame 210 along the radial direction.

The stator 360a may be implemented in a ring shape.

The frame 210, for example, may be provided with a frame body 211 having a cylindrical shape, a first rotor supporting portion 221 formed on one side of an outer surface of the frame body 211, a second rotor supporting portion 231 formed on an inner surface of the frame body 211, and a stator supporting portion 241 formed on another side of the outer surface of the frame body 211.

The frame body 211, for example, may be formed in a penetrating manner so that the rotation shaft 160 is inserted into a center thereof.

The first rotor supporting portion 221 may be formed on one side of an outer diameter surface of the frame body 211.

The stator supporting portion 241 may be formed on another side of the outer diameter surface of the frame body 211.

The second rotor supporting portion 231 may be formed on one side of an inner diameter surface of the frame body 211.

The first rotor supporting portion 221 may be provided with a first bearing 250 so as to rotatably support the first rotor 280.

The first bearing 250, for example, may include an inner ring 251, an outer ring 253 disposed concentrically with respect to the inner ring 251, and a rolling member 255 provided between the inner ring 251 and the outer ring 253.

The first rotor supporting portion 221 may be provided with a stopper 223 for limiting an insertion depth of the first bearing 250 and axially supporting the first bearing 250.

The stator supporting portion 241 may be provided at the frame body 211 so as to support the stator 360a.

The stator supporting portion 241, for example, may include an extension portion 243 extending from the frame body 211 along the radial direction, and a bent portion 245 bent from an end portion of the extension portion 243 in the axial direction.

The bent portion 245 may be bent from the extension portion 243 toward the first rotor 280.

The bent portion 245 may have a cylindrical shape extending along the circumferential direction.

The stator 360a may be provided in a manner of outwardly extending toward the stator supporting portion 241 along the radial direction.

As illustrated in FIGS. 7 and 8, the stator 360a, for example, may be provided with a stator core 361 having a plurality of teeth 363 disposed to be apart from each other in the circumferential direction, and a stator coil 371 wound around the stator core 361.

The plurality of teeth 363, for example, may include a horizontal section 364 disposed in the axial direction and a vertical section 365 extending perpendicular to both ends of the horizontal section 364.

The stator coil 371, for example, may be intensively wound around the horizontal section 364.

The vertical section 365 may be more radially and circumferentially extended compared to the horizontal section 364.

Accordingly, the stator coil 371 wound around the horizontal section 364 can be prevented from being displaced.

The stator 360a may be provided with an insulation portion 375 configured as an electrically insulated member. The insulation portion 375 is molded to enclose the plurality of teeth 363, which has the stator coil 371 wound therearound and is disposed on an outer side of the stator supporting portion 241 in a spaced manner along the circumferential direction.

Each vertical section 365 of the plurality of teeth 363 may have an outer surface exposed to an outer side of the insulation portion 375.

Each vertical section 365 of the plurality of teeth 363 may be spaced apart from a permanent magnet 291 of the first rotor 280 and a permanent magnet 291 of the second rotor 310, respectively, with a predetermined air gap.

The first rotor 280, for example, may include a first rotor frame 281 having a disk shape and the permanent magnet 291 provided in the first rotor frame 281.

A fixing member coupling portion 289 may be provided at an edge (rim) of the first rotor frame 281 so that a fixing member 295 is inserted therein.

The fixing member 295, for example, may be implemented as a bolt 296 and a nut 297 threadedly engaged with the bolt 296.

The bolt 296 may have a length enough to be simultaneously coupled to the first rotor 280, a connecting member 340a to be described later, and the second rotor 310 in a penetrating manner.

The fixing member coupling portion 289, for instance, may be formed to protrude outward from an outer diameter surface of the first rotor frame 281 along the radial direction.

The fixing member coupling portion 289 may be provided with a through hole for inserting the bolt 296 therein.

The first bearing coupling portion 285 may be provided at a central area of the first rotor frame 281 so that the first bearing 250 is coupled thereto.

The first bearing coupling portion 285, for example, may be provided with an outer ring insertion portion 286 in which the outer ring 253 of the first bearing 250 is inserted and a stopper 287 for limiting an insertion depth of the first bearing 250 by making contact with a side surface of the first bearing 250 and for axially supporting the first bearing 250.

The stopper 287, for example, may be configured to be in contact with the outer ring 253 of the first bearing 250.

As illustrated in FIG. 9, the first rotor frame 281, for example, may be provided with a permanent magnet insertion portion 283 so that one portion of the permanent magnet 291 is inserted therein.

Here, a depth of the permanent magnet insertion portion 283 may be appropriately adjusted.

The frame 291 may have a disc shape.

The first magnet 291, for example, may be provided with a plurality of magnetic pole portions formed such that opposite magnetic poles (N-pole and S-pole) are alternately arranged along the circumferential direction.

The second rotor supporting portion 231 may be formed in the frame.

The second rotor supporting portion 231, for instance, may be provided with a second bearing 260 rotatably supporting the second rotor 310.

The second bearing 260, for example, may include an inner ring 261, an outer ring 263 disposed concentrically with respect to the inner ring 261, and a rolling member 263 provided between the inner ring 261 and the outer ring 263.

As for the second rotor supporting portion 231, for example, an inner diameter of the frame body 211 may be cut off to be extended along the radial direction for limiting an insertion depth of the second bearing 260 and axially supporting the second bearing 260.

The outer ring 263 of the second bearing 260 may be insertedly coupled to an inner diameter surface of the second rotor supporting portion 231.

A fixing member insertion hole 213 may be formed through the frame body 211 so that the fixing member 217 penetrating the frame 210 to be fixed to the tub 120 is inserted therein.

One side of the fixing member insertion hole 213 may be provided with a head receiving portion 215 formed to be expanded for inserting a head of the fixing member 217.

The second rotor 310, for example, may include a second rotor frame 311 with a disk shape and a permanent magnet 291 provided in the second rotor frame 311.

In this embodiment, the permanent magnet 291 of the first rotor 280 and the permanent magnet 291 of the second rotor 310 may have the same size and shape.

A plurality of fixing member coupling portion 319 may be provided at an edge (rim) of the second rotor frame 311 so that the fixing member 295 is coupled thereto.

The fixing member coupling portion 319 of the second rotor frame 311 may be formed to correspond to the fixing member 289 of the first rotor frame 281.

The rotor frame 311 may be provided at its center with a rotation shaft connecting member 331 to which the rotation shaft 160 is connected.

The rotation shaft connecting member 331, for example, may be provided with a cylindrical portion 332 formed through a center thereof for inserting the rotation shaft 160, and a flange 334 extending from one side of the cylindrical portion 332 along the radial direction.

The second rotor frame 311 may be provided with a rotation shaft connecting member insertion portion 321 in which the rotation shaft connecting member 331 is inserted.

The rotation shaft connecting member insertion portion 321, for example, may be formed in a penetrating manner so that the cylindrical portion 332 of the rotation shaft connecting member 331 is inserted therein, and be formed to protrude in the axial direction.

The rotation shaft connecting member insertion portion 321, for example, may be provide with a female thread portion 323 so that the fixing member 337 is threadedly engaged therewith through the rotation shaft connecting member 331.

A plurality of fixing member insertion holes 335 may be formed through the flange 334 of the rotation shaft connecting member 331 for inserting the fixing member 337 therein.

The second bearing 260 may be coupled to the rotation shaft connecting member insertion portion 321.

The inner ring 261 of the second bearing 260 may be insertedly coupled to an outer surface of the rotation shaft connecting member insertion portion 321.

The rotation shaft connecting member insertion portion 321, for instance, may be provided with a stopper 325 for limiting an insertion depth of the second bearing 260 and axially supporting the second bearing 260.

The inner ring 261 of the second bearing 260 may be in contact with and supported on the stopper 325 along the axial direction.

As illustrated in FIG. 10, the second rotor frame 311, for example, may be provided with a permanent magnet insertion portion 313 formed to be recessed so that one area of the permanent magnet 291 is inserted therein.

A plurality of communicating portions 327 communicating with the fixing member insertion hole 213 is formed through the second rotor frame 311 so that the fixing member 217 fixed to the housing 135 of the tub 120 is inserted therein.

The plurality of communicating portions 327, for example, may have substantially a same diameter as the head receiving portion 215 so that the head of the fixing member 217 passes therethrough.

Hereinafter, the rotor end supporting portion will be described with reference to FIGS. 11 to 13.

Figure 11:
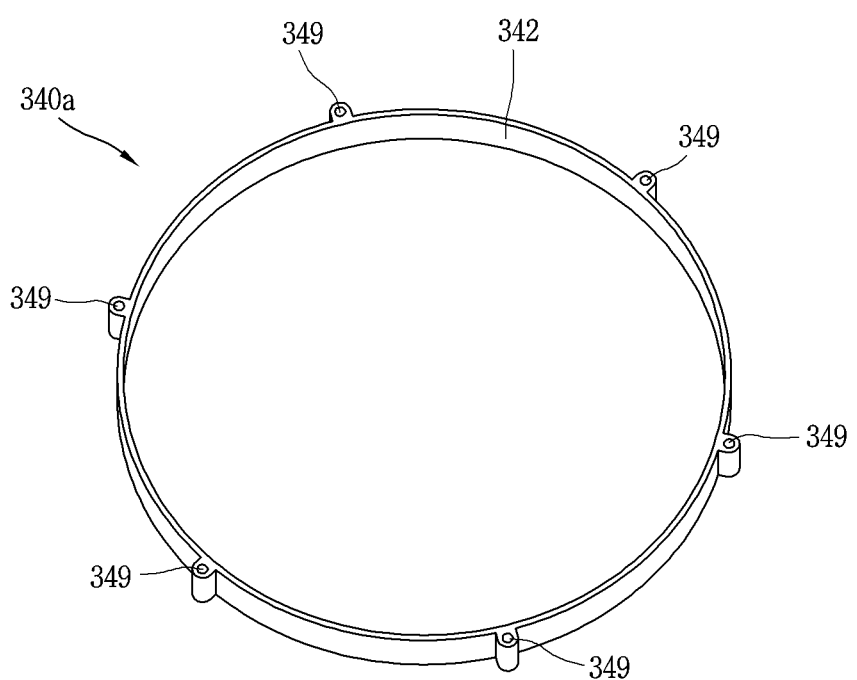
FIG. 11 is a perspective of a connecting member of the rotor end supporting portion of FIG. 3.
Figure 12:
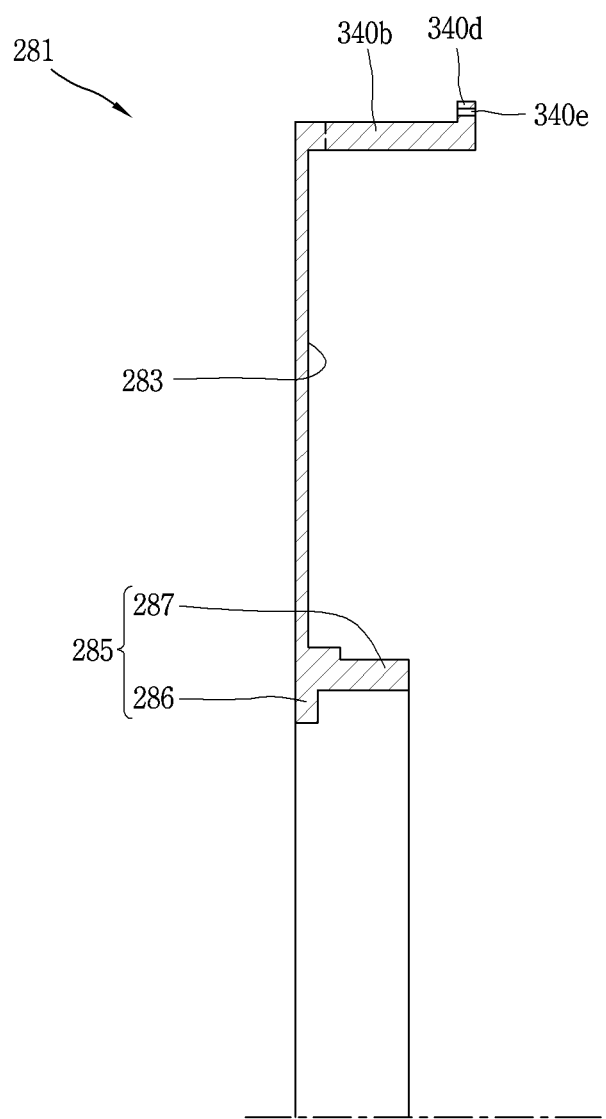
FIG. 12 is a view of another example of the rotor end supporting portion of FIG. 3.
Figure 13:
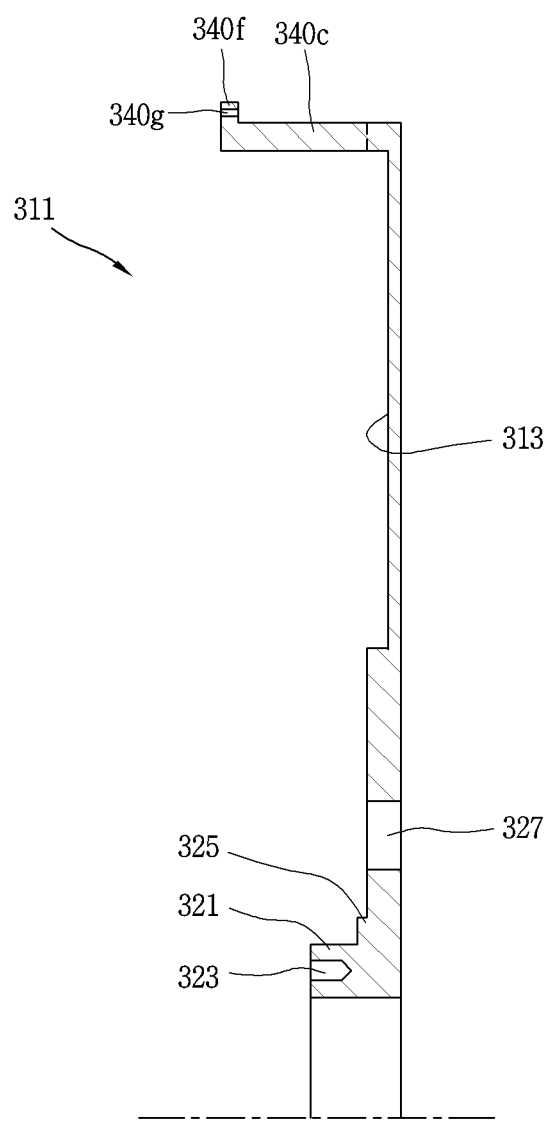
FIG. 13 is a view of still another example of the rotor end supporting portion of FIG. 3.

FIG. 11 is a perspective of a connecting member of the rotor end supporting portion of FIG. 3, FIG. 12 is a view of another example of the rotor end supporting portion of FIG. 3, and FIG. 13 is a view of still another example of the rotor end supporting portion of FIG. 3.

Meanwhile, referring to FIGS. 3 to 5, the axial air gap motor according to this embodiment may be provided with the rotor end supporting portion 340 disposed at an outer side of the stator 360a along the radial direction so as to axially support the first rotor 280 and the second rotor 310.

The rotor end supporting portion 340, for example, may be disposed between the first rotor 280 and the second rotor 310 and be provided with a connecting member 340a connecting the first rotor 280 and the second rotor 310.

The connecting member 340a, as illustrated in FIG. 11, may be provided with a body 342 formed in a cylindrical shape and having an outer diameter substantially equal to an outer diameter of the first rotor 280 and an outer diameter of the second rotor 310.

Through this configuration, the first rotor 280 and the second rotor 310 are integrally connected to each other, thereby offsetting a magnetic force (attractive force or repulsive force) between the first rotor 280 and the stator 360a, and a magnetic force between the second rotor 310 and the stator 360a. Accordingly, vibration of the first rotor 280 and the second rotor 310 generated by the magnetic force during an operation can be suppressed.

In addition, since the vibration of the first rotor 280 and the second rotor 310 is suppressed, noise generated by the vibration can be suppressed, thereby ensuring a quiet operation.

The connecting member 340a may be provided with a plurality of fixing member coupling portions 349 so that the fixing member 295 is coupled thereto, respectively.

The plurality of fixing member coupling portions 349 of the connecting member 340a may be formed to communicate with the fixing member coupling portion 289 of the first rotor frame 281 and the fixing member coupling portion 319 of the second rotor frame 311.

Meanwhile, the rotor end supporting portion 340, as illustrated in FIG. 12, may include a first connecting portion 340b provided at the first rotor frame 281.

The first connecting portion 340b, for example, may be formed in a circular shape protruding from an inner surface of the first rotor frame 281 along the axial direction and extending along the circumferential direction.

The first connecting portion 340b may be integrally formed with the first rotor frame 281 when manufactured.

The first connecting portion 340b, for example, may be formed to have a length corresponding to an interval (or gap) between the first rotor frame 281 and the second rotor frame 311 so that an end thereof makes contact with the second rotor frame 311.

The end of the first connecting portion 340b may be provided with a plurality of fixing member coupling portions 340d so that a fixing member (not shown) passing through the second rotor frame 311 is coupled thereto, respectively.

Through this, the first rotor frame 281 and the second rotor frame 311 are integrally connected to each other, thereby suppressing axial displacement and deformation of the first rotor 280 and the second rotor 310.

The fixing member coupling portion 340d, for example, may be formed to protrude outward from an outer surface of the first connecting portion 340b along the radial direction.

A penetrating portion 340e may be formed through each of the fixing member coupling portions 340d so that the fixing member is inserted therein.

In addition, the rotor end supporting portion 340, for example, may include a second connecting portion 340c provided at the second rotor frame 311, as shown in FIG. 13.

The second connecting portion 340c, for example, may be formed in a cylindrical shape protruding from an inner surface of the second rotor frame 311 along the axial direction and extending along the circumferential direction.

The second connecting portion 340c, for example, may have a length corresponding to an interval (or gap) between the first rotor frame 281 and the second rotor frame 311, so that an end thereof comes in contact with the first rotor frame 281.

The end of the second connecting portion 340c may be provided with a plurality of fixing member coupling portions 340f so that a fixing member (not shown) passing through the first rotor frame 281 is coupled thereto, respectively.

Through this, the first rotor frame 281 and the second rotor frame 311 are integrally connected to each other, thereby suppressing axial displacement and deformation of the first rotor 280 and the second rotor 310.

The fixing member coupling portion 340f, for example, may be formed to protrude outward from an outer surface of the first connecting portion 340c along the radial direction.

A penetrating portion 340g may be formed through each of the fixing member coupling portions 340f so that the fixing member is inserted therein.

The stator supporting portion 241 may be provided on the frame body 211 to support the stator 360a.

The stator supporting portion 241 may include the extension portion 243 extending from the frame body 211 along the radial direction, and the bent portion 245 bent from an end portion of the extension portion 243 in the axial direction (see FIG. 8).

The bent portion 245 may be bent from the extension portion 243 toward the first rotor 280.

The bent portion 245 may have a cylindrical shape extending along the circumferential direction.

The stator 360a may be provided in a manner of outwardly extending toward the stator supporting portion 241 along the radial direction.

The stator 360a, for example, may be provided with a stator core 361 having the plurality of teeth 363 disposed to be apart from each other in the circumferential direction, and the stator coil 371 wound around the stator core 361.

Each of the plurality of teeth 363 may include the horizontal section 364 disposed in the axial direction and the vertical section 365 extending perpendicular to both ends of the horizontal section 364.

The stator coil 371, for example, may be intensively wound around the horizontal section 364.

The vertical section 365 may be more radially and circumferentially extended compared to the horizontal section 364.

Accordingly, the stator coil 371 wound around the horizontal section 364 can be prevented from being displaced.

The stator 360a may be provided with an insulation portion 375 configured as an electrically insulated member molded to enclose the plurality of teeth 363, which has the stator coil 371 wound therearound and is disposed on an outer side of the stator supporting portion 241 in a spaced manner along the circumferential direction.

Each vertical section 365 of the plurality of teeth 363 may have an outer surface exposed to an outer side of the insulation portion 375.

Each vertical section 365 of the plurality of teeth 363 may be spaced apart from the permanent magnet 291 of the first rotor 280 and the permanent magnet 291 of the second rotor 310, respectively, with a predetermined air gap.

Hereinafter, configurations of the permanent magnet of the first rotor and the permanent magnet of the second rotor will be described with reference to FIGS. 14 to 16.

Figure 14:
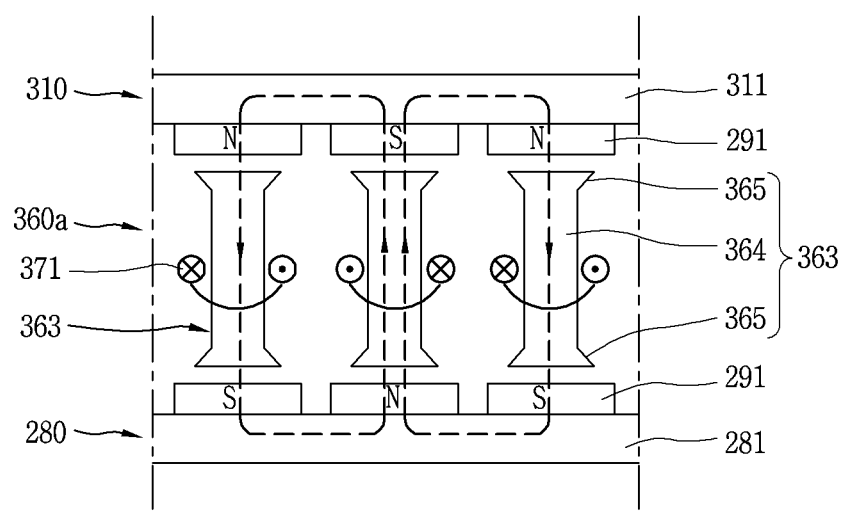
FIG. 14 is a view illustrating a configuration of the stator and the rotor of FIG. 3.

As illustrated in FIG. 14, the permanent magnet 291 of the first rotor 280 and the permanent magnet 291 of the second rotor 310, for example, may be formed such that each of the opposite magnetic poles (N-pole and S-pole) are disposed with respect to the same tooth 363.

Accordingly, a magnetic pole portion of the permanent magnet 291 of the first rotor 280, and a magnetic pole portion of the permanent magnet portion 291 of the second rotor 310 disposed on opposite sides of each tooth 363 may form a single magnetic path, respectively.

Figure 15:
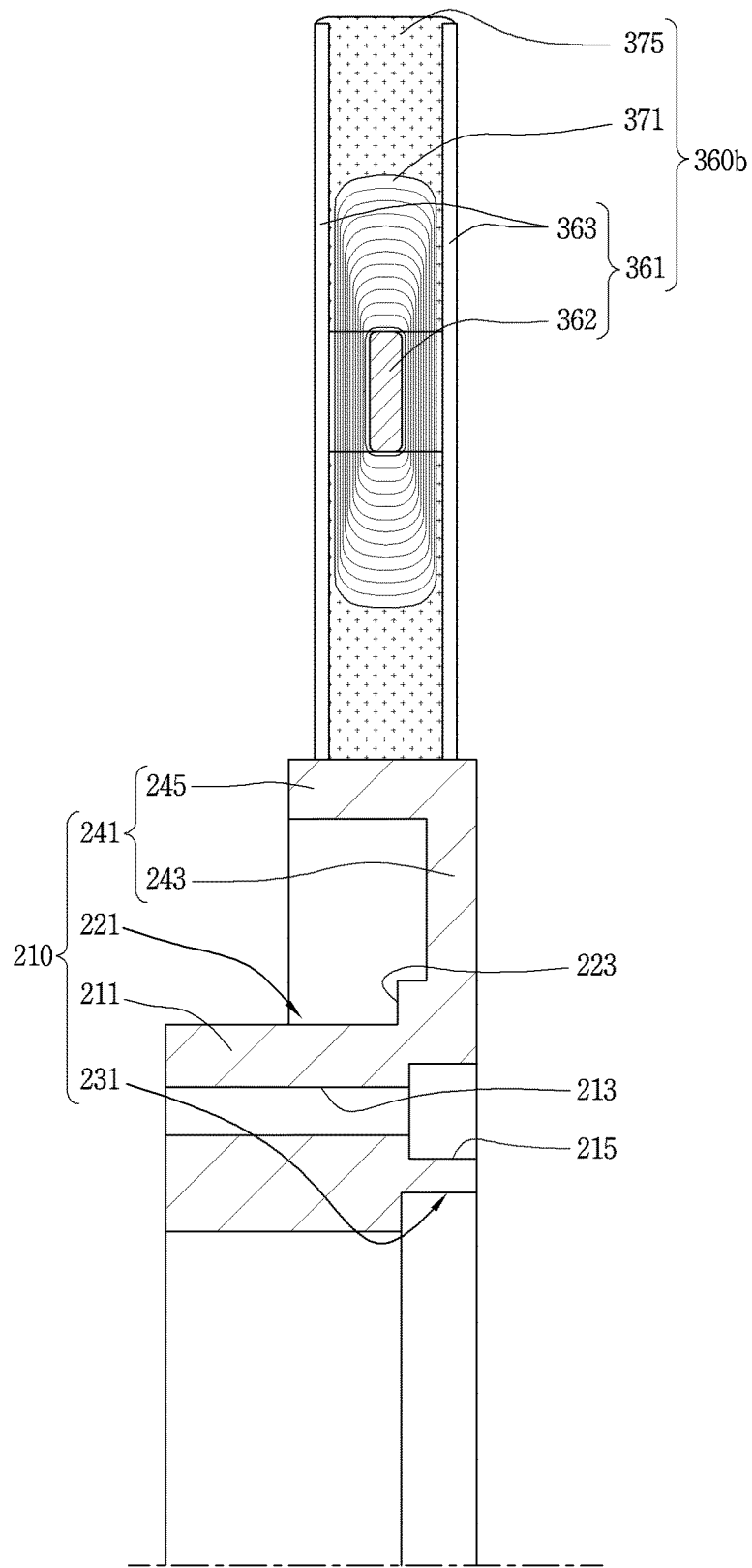
FIG. 15 is a sectional view of a frame and a stator in accordance with another embodiment of the present disclosure.
Figure 16:
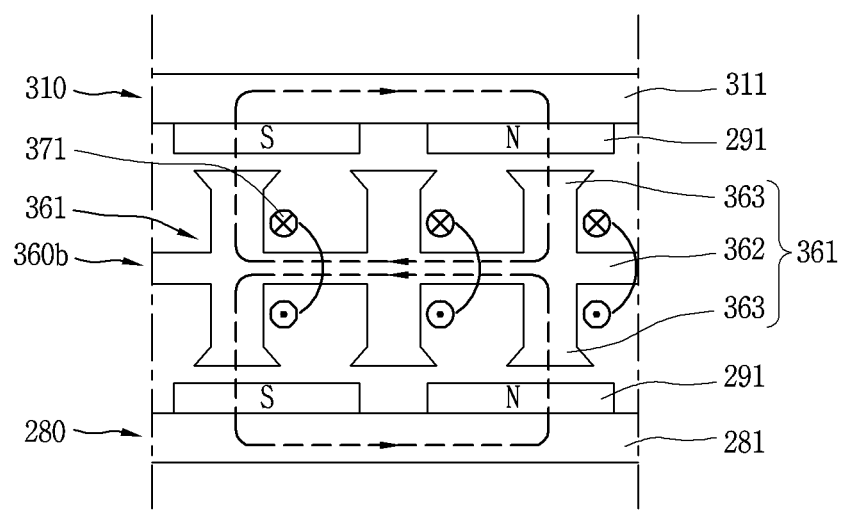
FIG. 16 is a view illustrating a configuration of the stator and the rotor of FIG. 15.

Meanwhile, as illustrated in FIGS. 15 and 16, a stator 360b may be provided with a stator core 361 having a yoke portion 362 with a circular shape and a plurality of teeth 363 protruding from the yoke portion 362 in the axial direction, and a stator coil 371 wound around the stator core 361.

The plurality of teeth 363 may be disposed to be apart from each other at predetermined intervals along a circumferential direction of the yoke portion 362.

The stator coil 371, for example, may be provided between each of the plurality of teeth 363 arranged along the circumferential direction.

The stator coil 371, for example, may be wound around the yoke portion 362 disposed between the plurality of teeth 363 with some spacing therebetween in the circumferential direction.

As illustrated in FIG. 16, same magnetic poles of the permanent magnet 291 of the first rotor 280 and the permanent magnet 291 of the second rotor 310 are disposed with respect to each same tooth 363.

Accordingly, a magnetic path between the first rotor 280 and the stator core 361, and a magnetic path between the second rotor 310 and the stator core 361 may be formed in the same direction.

Because of this configuration, when coupling the axial air gap motor 200, the permanent magnet 291 needs to be initially coupled to the first rotor frame 281 and the second rotor frame 311, respectively.

The first rotor 280 may be coupled to the first rotor supporting portion 221 of the frame 210 by interposing the first bearing 250 therebetween.

The connecting member 340a may be disposed on the outer side of the stator 360a, and the second bearing 260 may be coupled to the second rotor supporting portion 231 of the frame 210 by interposing the second bearing 260 therebetween.

The bolt 296 is inserted into the fixing member coupling portion 289 of the first rotor 280, the fixing member coupling portion 349 of the connecting member 340a and the fixing member coupling portion 319 of the second rotor 310, and the nut 297 is threadedly engaged with the other side, so that the first rotor 280, the connecting member 340a, and the second rotor 310 are integrally coupled to each other.

Meanwhile, when coupling the axial air gap motor 200 to the tub 120, the rotation shaft 160 protruding backward to the tub 120 may be inserted into the rotation shaft connecting member 331 of the axial air gap motor 200.

When the axial air gap motor 200 is pressed toward the tub 120, a mounting surface of the frame 210 may be in contact with an end portion of the housing 135.

The communicating portion 327, the fixing member insertion portion 213, and the female thread portion 137 of the housing 135 may communicate with each other by relatively rotating the axial air gap motor 200.

Then, the fixing member 217 may be inserted into each of the fixing member insertion hole 213 through the communicating portion 327, and the fixing member 217 may be rotated so as to be threadedly engaged with the respective female thread portion 137.

After each of the fixing members 217 is threadedly engaged, the serration 162 of the rotation shaft 160 may be completely inserted and coupled to the serration 336 of the rotation shaft connecting member 331.

Since the axial air gap motor 200 of this embodiment has a compact structure with a relatively shorter axial length and radial length, an installation space (occupied space) inside the cabinet 110 can be significantly reduced.

Accordingly, the axial size of the tub 120 and the drum 150 can be increased without increasing the size of the cabinet 110, thereby increasing the clothing processing capacity.

Further, an output of the motor can be remarkably increased since the first rotor 280 and the second rotor 310 are provided on opposite sides of the stator 360a with the stator 360a interposed therebetween.

In addition, since the magnetic force between the stator 360a and the first rotor 280, and the magnetic force between the stator 360a and the second rotor 310 are offset from each other, vibration caused by the magnetic force is suppressed and noise is reduced accordingly, thereby ensuring a quiet operation.

The foregoing description has been given of specific embodiments of the present disclosure. However, the present disclosure may be embodied in various forms without departing from the spirit or essential characteristics thereof, and thus the above-described embodiments should not be limited by the details of the detailed description.

In addition, even embodiments not listed in the detailed description should be interpreted within the scope of the technical idea defined in the appended claims. It is intended that the present disclosure cover the modifications and variations of this disclosure provided they come within the scope of the appended claims and their equivalents.

INDUSTRIAL AVAILABILITY

The present disclosure may be applied and applicable to various products in which an axial air gap motor is used. For example, the axial air gap motor may be applied to a clothing processing apparatus.

The invention claimed is:
1. An axial motor, comprising:
a frame;
a stator attached to the frame;
a rotation shaft that passes through the frame and is configured to be rotatable with respect to the frame;
a first rotor attached to a second rotor and spaced apart from a first side of the stator in an axial direction;
the second rotor attached to the rotation shaft and spaced apart from a second side of the stator in the axial direction; and
a circumferential support band provided at an outer circumferential edge of the stator along the a radial direction and configured to axially attach the first rotor to the second rotor,
wherein the frame comprises:
a frame body having a cylindrical shape;
a first rotor supporter formed on an outer circumferential surface of the frame body;
a second rotor supporter formed on an inner circumferential surface of the frame body; and
a stator supporter that protrudes radially from the outer circumferential surface of the frame body,
wherein the stator supporter is provided at an outside of the first rotor supporter in the radial direction,
wherein the first rotor supporter and the stator supporter are overlapped in the radial direction, and wherein the stator supporter and the second rotor supporter are overlapped in the radial direction.

2. The axial motor of claim 1, wherein the frame is configured to be attached to a stationary object.

3. The axial motor of claim 1, wherein the circumferential support band comprises:
 a circular band provided between the first rotor and the second rotor; or
 an axial extension that extends from any one of the first rotor and the second rotor toward the other of the first rotor and the second rotor.

4. The axial motor of claim 1, wherein each of the first rotor and the second rotor comprises:
 a rotor frame having a disk shape; and
 a permanent magnet provided on the rotor frame so as to magnetically interact with the stator.

5. The axial motor of claim 4, wherein the rotor frame is formed of a magnetic material.

6. The axial motor of claim 5, wherein the permanent magnet includes a plurality of permanent magnets spaced apart from each other along a circumferential direction.

7. The axial motor of claim 4, further comprising a first bearing provided between the first rotor and the frame so as to rotatably support the first rotor, wherein the first rotor includes a first bearing coupling seat on which the first bearing is seated.

8. The axial motor of claim 7, further comprising a second bearing provided between the second rotor and the frame so as to rotatably support the second rotor, wherein the second rotor includes a second bearing coupling seat on which the second bearing is seated.

9. The axial motor of claim 8, further comprising a rotation shaft collar operably attached to the rotation shaft and the second rotor frame.

10. The axial motor of claim 4, wherein the frame includes a fastener insertion hole in which a fastener is inserted, the fastener being coupled to a stationary object through the frame along the axial direction, and
 wherein the second rotor includes a communicating hole through which the fastener passes to be inserted into the fastener insertion hole.

11. The axial motor of claim 10, wherein the stator comprises:
 a stator core attached to an outer circumferential side of the frame; and
 a stator coil wound around the stator core.

12. The axial motor of claim 11, wherein the stator core comprises a plurality of teeth spaced apart from each other along a circumferential direction, and
 wherein the stator comprises an insulator molded around the plurality of teeth.

13. The axial motor of claim 12, wherein each of the plurality of teeth comprises a first section that extends in the axial direction, and a second section that extends radially outward from the first section, the plurality of teeth being spaced apart from the first rotor and the second rotor, respectively, and wherein the stator coil is wound around the first section between the second sections.

14. The axial motor of claim 13, wherein the permanent magnet of the first rotor has a same magnetic pole as the permanent magnet of the second rotor along the axial direction.

15. The axial motor of claim 11, wherein the stator core comprises:
 a yoke having a circular shape; and
 a plurality of teeth that protrude from the yoke toward the first rotor and the second rotor, respectively.

16. The axial motor of claim 15, wherein the stator coil is wound around the yoke.

17. The axial motor of claim 16, wherein the permanent magnet of the first rotor has an opposite magnetic pole to the permanent magnet of the second rotor.

18. A clothing processing apparatus, comprising:
 a cabinet;
 a tub provided in the cabinet;
 a drum provided in the tub and configured to be rotatable with respect to the tub; and
 the axial motor according to claim 1 mounted on an outer surface of the tub and the rotation shaft of the axial motor is connected to the drum so as to rotate the drum.

19. The clothing processing apparatus of claim 18, wherein the tub comprises a housing that supports the rotation shaft in a rotatable manner, and
 wherein the frame of the axial motor is coupled to the housing along an axial direction.

* * * * *